United States Patent
Brumm et al.

[11] 3,817,220
[45] June 18, 1974

[54] TWO-STAGE INTERNAL COMBUSTION ENGINE OF THE ROTARY-PISTON TYPE

[75] Inventors: Karl Brumm; Konrad Thaler, both of Russelsheim, Germany

[73] Assignee: General Motors Corporation, Detroit, Mich.

[22] Filed: Dec. 21, 1972

[21] Appl. No.: 317,392

[30] Foreign Application Priority Data
Jan. 4, 1972   Germany............................ 2002331

[52] U.S. Cl..................... 123/8.05, 60/303, 60/901, 123/8.09
[51] Int. Cl......................... F01n 3/12, F02b 53/08
[58] Field of Search ........ 123/8.05, 8.09, 8.45, 221; 60/39.51, 15, 13 N, 901, 303, 280

[56] References Cited
UNITED STATES PATENTS

| | | | |
|---|---|---|---|
| 3,139,722 | 7/1964 | Yokoi .................................... | 60/15 |
| 3,507,261 | 4/1970 | Myers et al. ...................... | 60/901 X |
| 3,589,344 | 6/1971 | Steinke ............................ | 123/8.09 |
| 3,688,749 | 9/1972 | Wankel.................... | 123/8.05 X |

FOREIGN PATENTS OR APPLICATIONS

| | | | |
|---|---|---|---|
| 748,163 | 4/1956 | Great Britain ................ | 60/39.51 R |
| 1,020,274 | 2/1966 | Great Britain..................... | 123/8.45 |

*Primary Examiner*—Carlton R. Croyle
*Assistant Examiner*—Michael Koczo, Jr.
*Attorney, Agent, or Firm*—Ronald L. Phillips

[57] ABSTRACT

A two stage rotary-piston combustion engine of the Wankel type, having two rotary-piston units, acting respectively as a compressor unit and a prime mover unit, arranged side-by-side with the rotors mounted on a common shaft, and a combustion chamber, external to the two units, which is double-walled to provide a combustion space surrounded by a jacket. One transfer passage connects the exhaust of the compressor unit to the intake of the prime mover unit by way of the combustion chamber jacket, and a second transfer passage connects the exhaust of the prime mover unit to the intake of the compressor unit by way of the combustion space inside the jacket. The combustion chamber thus serves for afterburning of waste gases leaving the prime mover and for pre-heating of air induced by the compressor unit. By this means effective decontamination of the exhaust may be achieved.

2 Claims, 3 Drawing Figures

TWO-STAGE INTERNAL COMBUSTION ENGINE OF THE ROTARY-PISTON TYPE

This invention relates to a two-stage internal combustion engine of the rotary-piston type having a compressor unit and a working machine or prime mover.

An internal combustion engine has already been proposed which operates with two rotary pistons arranged one above the other and of differing size. The air induced by the larger piston arranged in the low-pressure stage is pre-compressed before it is delivered by an intake transfer channel to the high-pressure stage with the smaller rotary piston, for further compression. After injection of fuel at the dead centre of the high-pressure stage and expansion in this high-pressure stage, the gases flow through an outlet transfer channel back into the low-pressure stage where, after further expansion, they are expelled through an outlet channel. Due to the arrangement of the two stages above each other, a considerable space requirement is essential. Further, in the known engine, effective cleaning or decontamination of the exhaust gas is lacking.

It is the main object of the present invention to improve the known two-stage engine still further and to render possible satisfactory exhaust decontamination. According to the invention, this problem is solved in advantageous manner by arranging the compressor unit and the prime mover side by side and connecting them together by way of a combustion chamber which serves for the afterburning of the noxious exhaust gases leaving the prime mover, as well as for pre-heating the air induced and delivered by the compressor unit.

The arrangement of the prime mover beside the compressor unit results in a small overall volume. The use of a combustion chamber between the compressor unit and the prime mover has the advantage that it is possible to attain a rise in the specific performance accompanied by a simultaneous drop in the specific fuel consumption and a far-reaching elimination of noxious waste gases. The weight per horse power is therefore reduced by comparison with the known engines.

Further features and advantages of the invention may be gathered from the accompanying schematic drawings and the relevant description of an example of engine according to the invention.

Figure 1:
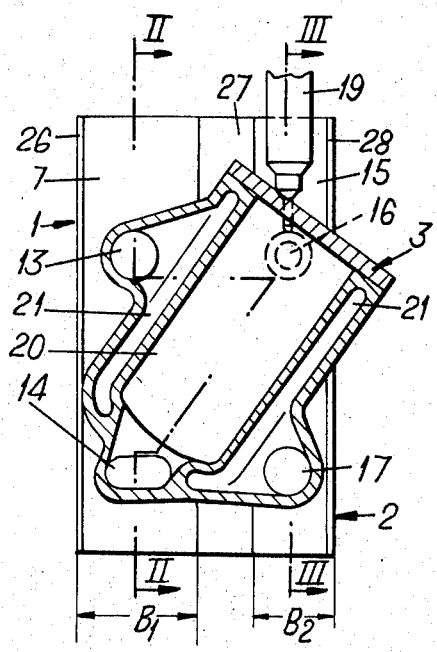
FIG. 1 is a side elevation of the rotary-piston engine.

The rotary-piston engine according to the invention consists of two rotary-piston units, a compressor unit 1 and a working machine or prime mover unit 2, disposed side by side. Each unit is of the so-called Wankel type comprising a cavity defined by the inwardly-facing peripheral wall of a respective housing 7 or 15 and a pair of axially spaced end walls, for example as indicated at 26 and 28. The peripheral walls 7a and 15a of the units are each the shape of a two-lobed epitrochoid, or a curve parallel thereto, whose centre is indicated at 30 where major and minor axes of the curve intersect. A power output shaft 6, which may be called a crankshaft, extends through the cavity and is rotatably supported by the end walls so that the shaft axis is coincident with the centre 30 and parallel to the peripheral wall 7a, 15a. The power output shaft 6 is provided in the cavity with an eccentric 31 on which a rotor 4 or 5 is mounted for rotation about the eccentric's axis, this axis being spaced from and parallel to the output shaft axis 30. The rotor 4, 5, has the general shape of a triangle with faces 32, 33, 34 (for rotor 4) and faces 35, 36, 37 (for rotor 5) which are convex and face the peripheral wall 7a or 15a and co-operate therewith and with the end walls to define three variable-volume combustion or working chambers 38 or 39. Appropriate sealing arrangements (not shown) are provided comprising, in the main, an apex seal (not shown) mounted at each apex or corner of the rotor, and a side seal (not shown) extending between each set of adjacent apex seals. The apex seals continuously engage the peripheral wall and the side seals continuously engage the side walls. This seal arrangement acts to seal the working chambers 38 or 39. With the two-lobed peripheral wall 7a, 15a and the three-lobed rotor 4, 5, there are provided the four phases of intake, compression, expansion and exhaust in each chamber 38 or 39 in fixed relation to the housing 7 or 15 by forcing the rotor 4 or 5 to rotate at one-third the speed of the output shaft 6. This is accomplished by a gear train (not shown) comprising an internally-toothed ring gear fixed to the rotor 4 or 5 concentric with the rotor axis which is the axis of eccentric 31. This ring meshes with an externally-toothed gear (not shown) which is concentric with the crankshaft axis 30 and is made stationary by being fixed to the engine housing 7 or 15. The ring gear has one and a half times the number of teeth of the stationary gear to provide the required 3:1 rotation ratio between the crankshaft 6 and the rotor 4 or 5.

The construction of each rotary piston unit 1, 2, as so far described, is conventional. Typically such units have each of the three working chambers undergoing intake, compression, expansion and exhaust with a single rotor arrangement providing a power phase for each revolution of the crankshaft.

According to the present invention a combustion chamber 3 is located between (as respects the flow of intake and exhaust gas from one unit to the other) the compressor unit 1 and the prime mover 2. The rotary piston 4 of the compressor unit 1 and the rotary piston 5 of the prime mover 2 are mounted on a common shaft 6. The units 1 and 2 are separated and closely abutted by an intermediate housing 27 which serves as the end wall at the inner faces of the units 1 and 2. The end walls at the outer faces are shown at 26, 28. The intermediate housing may also contain cooling water and oil passages, and may also serve as housing and support for a bearing for the shaft 6. The housing 7 of the compressor unit 1 is provided with an air entry aperture 10 controlled by a valve 10a and which is in communication with an air filter 12 through an induction pipe 11. The compressor unit 1 is connected to the combustion chamber 3 through two passages 13 and 14. The housing 15 has two passages 16 and 17 leading to the combustion chamber 3, passage 16 being provided with an expansion nozzle (Laval nozzle) 18 having a fuel-injection device, or an intake device for additional air, at 19.

The combustion chamber 3 is double-walled, to provide a combustion space 20 enclosed by a jacket 21, thus permitting a heat exchange between space 20 and the air or the air-fuel mixture flowing in the channels forming the jacket 21. An injection device 22 for fuel discharges into the channels 21. A spark plug 23 inserted in the housing 15 of the prime mover provides the ignition for the fuel-air mixture operating on the Otto cycle. An outlet aperture 24 for the exhaust gases is located in housing 7.

The mode of operation of the arrangement according to the invention is as follows:

The compressor unit 1 draws in air at 10 and delivers it, either with or without supercharging effect, to the actual rotary-piston working machine or prime mover 2. The supercharging is determined according to the width ratio $B_1 : B_2$ of compressor unit 1 and prime mover 2. Air is delivered at 13, by the compressor unit, for pre-heating, i.e., for mixture preparation, and is passed through the jacket 21 over the wall of the combustion space 20 for cooling the wall of the space 20.

Before entry of the pre-heated air into the prime mover 2 at 17, fuel is sprayed through the device 22. In the prime mover 2, the resulting mixture is now subjected to the usual process of the cycle, comprising induction, compression, ignition, expansion and exhaust, and it therefore performs work. At the side facing the inlet aperture 17 for air or air-fuel mixture, a spark plug 23 is arranged for firing the compressed mixture.

Following the work process, the waste gases emerging from the expansion nozzle 18 are subjected to an after-burning process. Depending upon whether the combustion in the prime mover 2 takes place with excess of air or lack of air, the after-burning may be brought about by adding fuel or extra air, at 19, to the waste gases before entry into the combustion space 20. The high flow velocity prevailing in the expansion nozzle 18 ensures an excellent preparation of the mixture for the succeeding after-burning in the combustion space 20.

The constant pressure after-burning in the combustion space 20, which progresses at relatively low temperature and low pressure, results in a clean final combustion. The after-burnt gases are expelled at 14 into the compressor unit 1 and here they perform expansion work once more, so that the overall performance is raised and the specific fuel consumption is reduced. At 24, the exhaust gases pass out of the engine casing into a silencer or muffler (not shown).

The proportion of the power gain by the double expansion of the combustion gases by comparison with the performance of the prime mover is all the greater, the bigger the area ratio of the entry aperture 14 into the compressor unit 1 with respect to the cross-section of the expanding nozzle 18, and the bigger the ratio of the axial thickness ($B_1 : B_2$) of compressor unit and prime mover.

Figure 2:
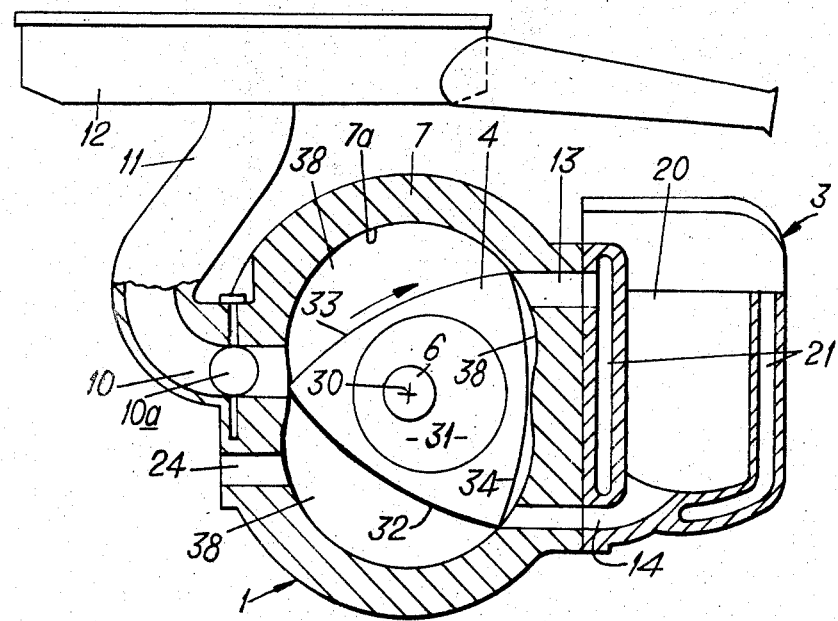
FIG. 2 is a section, on II—II of FIG. 1, through the compressor unit and the combustion chamber.
Figure 3:
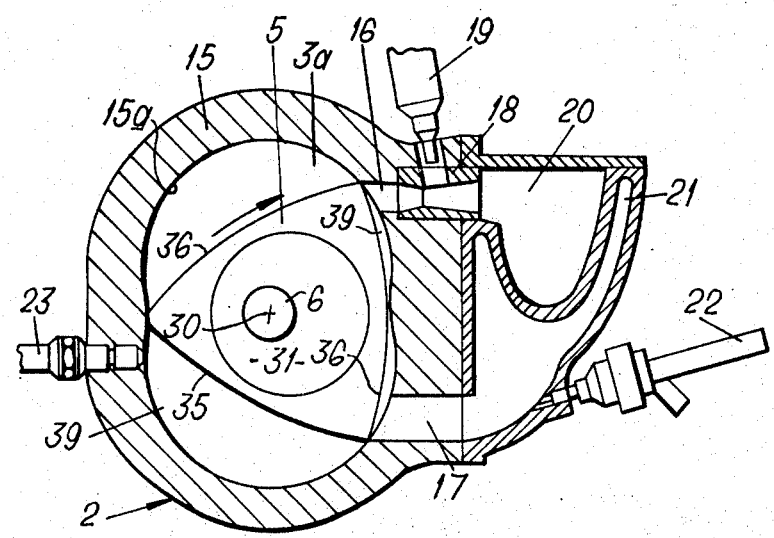
FIG. 3 is a section, on line III—III of FIG. 1, through the prime mover and the combustion chamber.

Whereas in the prime mover 2 an approximately isochore (constant-volume) combustion takes place, the task of the compressor unit 1 is a two-fold one, in that a compressor function or delivery function falls to its lot in its upper region (as seen in FIG. 2), whilst a substantially constant pressure expansion takes place in its lower region.

The rotors 4 and 5 of the two units 1 and 2 do not necessarily have to rotate in synchronism; they may be displaced in phase. The illustrated constructional unit with dual combustion may be extended to form an internal combustion engine set, by associating similar units together. For series production, operation and assembly, uniformity of the epitrochoid shape of the internal cavity is of advantage, i.e. it is advantageous to have any variations relate to the width only.

The $NO_x$ values of the exhaust emission are very low, both for a rich mixture ($\lambda \leq 0.8$) or for a weak mixture ($\lambda \geq 1.2$). With rich mixture the influence of the ignition timing on the combustion is very slight.

If the isochore (constant-volume) combustion in the prime mover 2 occurs with excess air then, with the surplus oxygen, after-burning may be brought about in the combustion space 20 by an additional supply of fuel. In this event the supply of fuel is effected by the injection device 19 in the region of the expansion nozzle 18.

If, on the other hand, the isochore combustion in the prime mover 2 takes place with a deficiency of air, then one must expect high CO and CH values, which is synonymous with high fuel consumption. In this case, the after-burning in combustion space 20 is effected by supplying extra air at 19, with the result that the combustible residual gases such as CH and CO are burnt and further work is performed in the compressor unit 1.

With the arrangement according to the invention, a rise in specific power is attained simultaneously with a lowering of the specific fuel consumption, whilst a far-reaching elimination of noxious exhaust gases is achieved in simple and favourable manner.

The invention is by no means limited to the embodiment described above and shown in the drawing. There are many modifications possible in the construction of the internal combustion engine, the arrangement of the individual parts, and the design of the control members, without thereby departing from the scope of the invention.

We claim:

1. A two-stage rotary-piston combustion engine comprising a compressor unit and a prime mover unit; each said unit including a housing, a rotor disposed within the housing, a shaft rotatably supported by the housing and operatively connected to the shaft of the other unit and having an eccentric rotatably supporting the rotor, said rotor and housing cooperatively providing variable volume working chambers spaced around the rotor which vary in volume while moving with the rotor within the housing, an intake port periodically connected to each of said working chambers during an intake phase as they expand, an exhaust port periodically connected to each of said working chambers during an exhaust phase as they contract; said compressor unit further having a first transfer port periodically connected to each of said compressor working chambers during a compression phase as they contract following the intake phase; said compressor unit further having a second transfer port periodically connected to each of said compressor working chambers during an expansion phase as they expand following the compression phase and before the exhaust phase; said prime mover unit having ignition means for initiating combustion in said prime mover working chambers in a power phase following a compression phase and before the exhaust phase; an external combustion chamber housing defining a combustion space and a separate gas transfer space heated by burning gas in the combustion space; said gas transfer space operatively connecting said first transfer port of said compressor unit to said intake port of said prime mover unit to provide for pre-heated air delivery from said compressor unit to said primary mover unit; a fuel injector for injecting fuel into the pre-heated air delivered from said gas transfer space to said prime mover unit; said combustion space operatively connected between said exhaust port of said prime mover unit and said second transfer port of said compressor unit to provide for after-burning of waste gases leaving said prime mover unit; an expansion nozzle connecting said exhaust port of said prime mover unit to said combustion space; and after-burner control means connected to said expansion nozzle for controlling the air-fuel ratio in said combustion space to effect after-burning therein.

2. A two-stage rotary-piston combustion engine comprising a compressor unit and a prime mover unit arranged side-by-side; each said unit including a housing, a rotor disposed within the housing, a shaft rotatably supported by the housing and joined to the shaft of the other unit and having an eccentric rotatably supporting the rotor, said rotor and housing cooperatively providing variable volume working chambers spaced around the rotor which vary in volume while moving with the rotor within the housing, an intake port periodically connected to each of said working chambers during an intake phase as they expand, an exhaust port periodically connected to each of said working chambers during an exhaust phase as they contract; said compressor unit further having a first transfer port periodically connected to each of said compressor working chambers during a compression phase as they contract following the intake phase; said compressor unit further having a second transfer port periodically connected to each of said compressor working chambers during an expansion phase as they expand following the compression phase and before the exhaust phase; said prime mover unit having ignition means for initiating combustion in said prime mover working chambers in a power phase following a compression phase and before the exhaust phase; an external combustion chamber housing defining a combustion space and a separate gas transfer space heated by burning gas in the combustion space; said gas transfer space operatively connecting said first transfer port of said compressor unit to said intake port of said prime mover unit to provide for pre-heated air delivery from said compressor unit to said primary mover unit; a fuel injector mounted on said combustion chamber housing for injecting fuel into the pre-heated air in said gas transfer space prior to delivery to said intake port of said prime mover unit; said combustion space operatively connected between said exhaust port of said prime mover unit and said second transfer port of said compressor unit to provide for after-burning of waste gases leaving said prime mover unit; an expansion nozzle mounted in said prime mover unit housing connecting said exhaust port of said prime mover unit to said combustion space; and after-burner control means mounted on said prime mover unit housing connected to the throat of said expansion nozzle for controlling the air-fuel ratio in said combustion space to effect after-burning therein.

* * * * *